United States Patent
Zheng et al.

(10) Patent No.: US 9,310,562 B2
(45) Date of Patent: Apr. 12, 2016

(54) WAVELENGTH-LOCKING A RING-RESONATOR FILTER

(71) Applicant: Oracle International Corporation, Redwood City, CA (US)

(72) Inventors: Xuezhe Zheng, San Diego, CA (US); Guoliang Li, San Diego, CA (US); Ying L. Luo, San Diego, CA (US); Ashok V. Krishnamoorthy, San Diego, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 120 days.

(21) Appl. No.: 14/203,876

(22) Filed: Mar. 11, 2014

(65) Prior Publication Data
US 2015/0277053 A1   Oct. 1, 2015

(51) Int. Cl.
*G02B 6/26* (2006.01)
*G02B 6/293* (2006.01)
*H04J 14/00* (2006.01)
*G02B 6/28* (2006.01)

(52) U.S. Cl.
CPC ............ *G02B 6/29341* (2013.01); *H04J 14/00* (2013.01); *G02B 6/2852* (2013.01)

(58) Field of Classification Search
CPC ............. G02B 6/29338; G02B 6/2934; G02B 6/29341
See application file for complete search history.

(56) References Cited

U.S. PATENT DOCUMENTS

| 7,079,721 | B2 * | 7/2006 | Kish, Jr. | B82Y 20/00 372/26 |
| 7,187,870 | B2 * | 3/2007 | Ilchenko | G02B 6/29395 398/161 |
| 7,480,425 | B2 * | 1/2009 | Gunn | G02B 6/12007 385/14 |

\* cited by examiner

*Primary Examiner* — Omar R Rojas
(74) *Attorney, Agent, or Firm* — Park, Vaughan, Fleming & Dowler LLP; Steven E. Stupp (57) ABSTRACT

In an optical device, a ring resonator, having a resonance wavelength, optically couples an optical signal that includes a wavelength from an input optical waveguide to an output optical waveguide. A monitoring mechanism in the optical device, which is optically coupled to the output optical waveguide, monitors an output optical signal on the output optical waveguide. For example, the monitoring mechanism may dither a temperature of the ring resonator at a frequency using a heater, and the output optical signal may be monitored by determining amplitude and phase information of the output optical signal at the frequency and twice the frequency. Moreover, control logic in the optical device adjusts the resonance wavelength based on the monitored output optical signal, where the adjustment is made without monitoring an input optical signal on the input optical waveguide.

14 Claims, 8 Drawing Sheets

FIG. 8

WAVELENGTH-LOCKING A RING-RESONATOR FILTER

GOVERNMENT LICENSE RIGHTS

This invention was made with United States government support under Agreement No. HR0011-08-9-0001 awarded by DARPA. The United States government has certain rights in the invention.

BACKGROUND

1. Field

The present disclosure relates to techniques for communicating optical signals. More specifically, the present disclosure relates to wavelength-locking a ring-resonator filter without monitoring an input optical signal to the ring-resonator filter.

2. Related Art

Silicon photonics is a promising technology that can provide large communication bandwidth, low latency and low power consumption for inter-chip and intra-chip connections. In the last few years, significant progress has been made in developing low-cost components for use in inter-chip and intra-chip silicon-photonic connections, including: high-bandwidth efficient silicon modulators, low-loss optical waveguides, wavelength-division-multiplexing (WDM) components, and high-speed CMOS optical-waveguide photo-detectors. However, a suitable WDM multiplexer/demultiplexer remains a challenge, the lack of which poses an obstacle to implementing WDM silicon-photonic links.

One approach to implementing a WDM multiplexer/demultiplexer is to use silicon ring resonators as add/drop filters (which are sometimes referred to as 'ring-resonator filters'). By cascading multiple ring-resonator filters, a multi-channel multiplexer/demultiplexer can be fabricated with desirable optical performance for area-sensitive applications. However, one well-known challenge for practical application of a ring-resonator multiplexer/demultiplexer is the uncertainty in the channel spacing and center wavelength that results from variations in the index of refraction of the effective silicon optical waveguide due to fabrication tolerances and ambient temperature change. Wavelength tuning is typically used to align and lock the ring-resonator filters with the optical signal carrier wavelengths.

There are both direct and indirect techniques for aligning and locking a ring-resonator filter to the carrier wavelength of an input optical signal. For example, temperature sensing and control can be used to indirectly control the resonance of the ring resonator filter. However, it can be difficult to accurately sense the ring-resonator temperature. Consequently, temperature control with sub-Kelvin accuracy is often difficult and typically results in significant power consumption.

Figure 1:
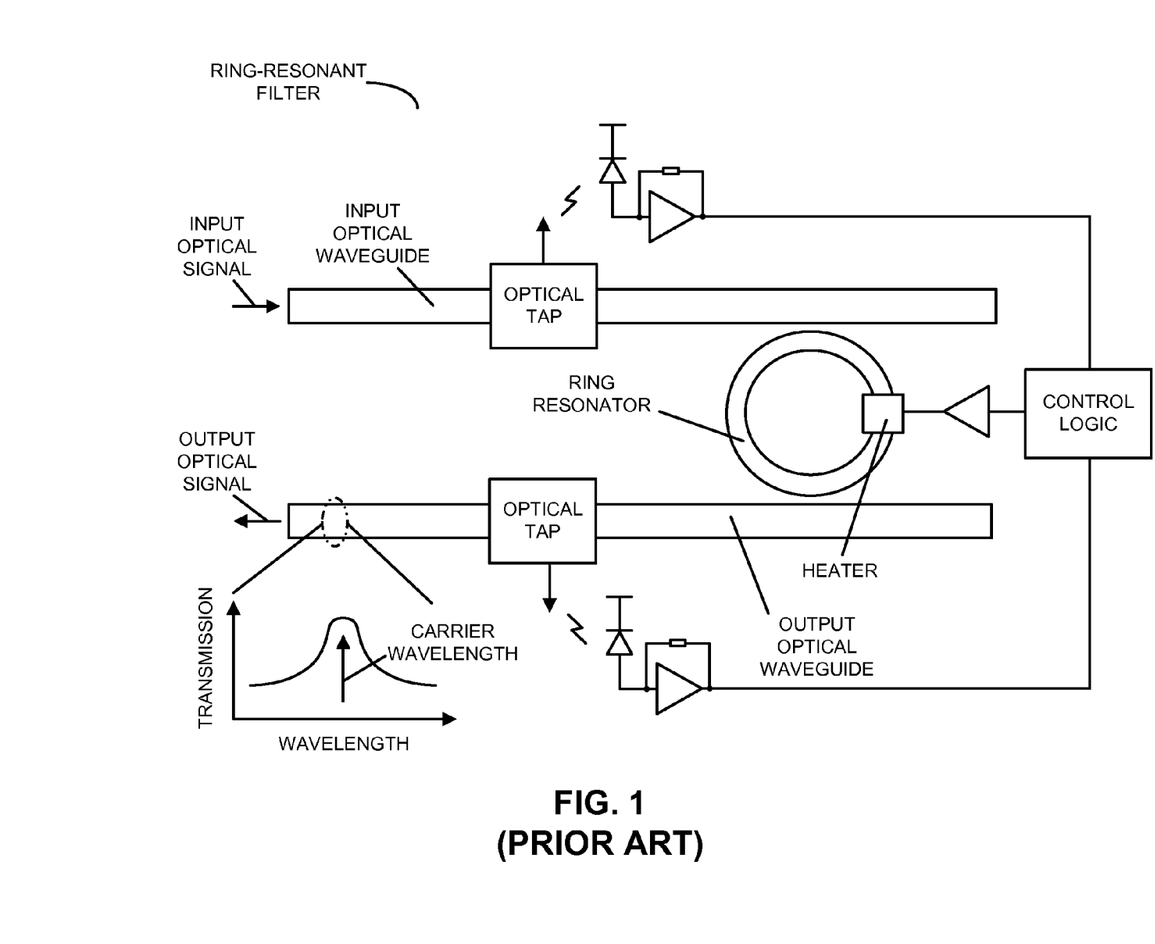
FIG. 1 is a block diagram of an existing ring-resonator filter.

For high fidelity, direct control is often used to control the resonance wavelength of the ring-resonator filter. As shown in FIG. 1, which presents a drawing of an existing filter, direct control of the resonance wavelength of the ring-resonator add/drop filter typically requires an optical tap to measure the output signal power of the ring-resonator filter by converting the tapped optical signal into an electrical signal. Then, an electrical controller (or control logic) analyzes the tapped optical signal and drives a thermal tuner (or heater) integrated with the ring-resonator filter to maximize the output of the ring-resonator filter. This control technique is based on the assumption that the power of the input optical signal is constant. In practice, the power of the input optical signal fluctuates. In order to be independent of these input-power variations, an input-power monitor is usually used so that the electrical controller can compare both the input and output power to align the resonant wavelength of the ring-resonator filter with the optical signal carrier wavelength.

However in a multi-channel multiplexer/demultiplexer, the input-power monitor sees the total power of multiple wavelength channels. Consequently, the electrical controller cannot determine the exact power fluctuation of any given channel, which makes it more difficult for the electrical controller to tune the ring-resonator filters.

Hence, what is needed is a ring-resonator filter without the above-described problems.

SUMMARY

One embodiment of the present disclosure provides an optical device that includes: an input optical waveguide that conveys an input optical signal that includes multiple wavelengths; a ring resonator, having a resonance wavelength, optically coupled to the input optical waveguide; an output optical waveguide that conveys an output optical signal that includes a wavelength in the multiple wavelengths; a monitoring mechanism, optically coupled to the output optical waveguide, which monitors the output optical signal; and control logic that adjusts the resonance wavelength based on the monitored output optical signal, where the adjustment is made without monitoring the input optical signal.

Note that the control logic may adjust the resonance wavelength to lock the resonance wavelength and the wavelength of the output optical signal. For example, the control logic may adjust the resonance wavelength by adjusting a temperature of the ring resonator. Consequently, the optical device may include a heater thermally coupled to the ring resonator.

In some embodiments, the control logic dithers the temperature of the ring resonator at a frequency. Moreover, the monitoring of the output optical signal may involve detecting amplitude and phase information at the frequency and twice the frequency. When the resonance wavelength and the wavelength of the output optical signal are locked, the amplitude at the frequency may be zero and the amplitude at twice the frequency may be non-zero. Alternatively, when the resonance wavelength exceeds the wavelength of the output optical signal, a sign of the phase may be opposite to the sign of the phase when the resonance wavelength may be less than the wavelength of the output optical signal.

Furthermore, the monitoring of the output optical signal may involve a Fourier transform.

Another embodiment provides a system that includes the optical device.

Another embodiment provides a method for locking the resonance wavelength of the ring resonator to the wavelength of the optical signal, which may be performed by the optical device. During operation, the optical device dithers the temperature of the ring resonator at the frequency using the heater. Then, the optical device monitors the output optical signal from the ring resonator, and determines amplitude and phase information of the output optical signal at the frequency and twice the frequency. Next, the optical device adjusts the resonance wavelength based on the determined amplitude and phase information, where the adjustment is made without monitoring the input optical signal to the ring resonator.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an optical device, a system that includes the optical device, and a technique for locking a resonance wavelength of a ring resonator to a wavelength of an optical signal are described. In an optical device, the ring resonator, having a resonance (center) wavelength, optically couples the optical signal that includes the wavelength from an input optical waveguide to an output optical waveguide. A monitoring mechanism in the optical device, which is optically coupled to the output optical waveguide, monitors an output optical signal on the output optical waveguide. For example, the monitoring mechanism may dither a temperature of the ring resonator at a frequency using a heater, and the output optical signal may be monitored by determining amplitude and phase information of the output optical signal at the frequency and twice the frequency. Moreover, control logic in the optical device adjusts the resonance wavelength based on the monitored output optical signal, where the adjustment is made without monitoring an input optical signal on the input optical waveguide (and, thus, without monitoring the input optical-signal power).

By wavelength-locking the optical device using the monitoring mechanism, this control technique may allow the ring resonator to be tuned independently of input-power fluctuation. Thus, the input optical signal does not need to be monitored. The control technique may be used for single-channel add/drop filters and/or for multi-channel optical devices. Consequently, multiple, cascaded instances of the optical device may be used to implement a multiplexer/demultiplexer. Furthermore, the optical device may help facilitate high-speed inter- and intra-chip silicon-photonic interconnects, as well as associated systems that can include the optical device (such as high-performance computing systems).

Figure 2:
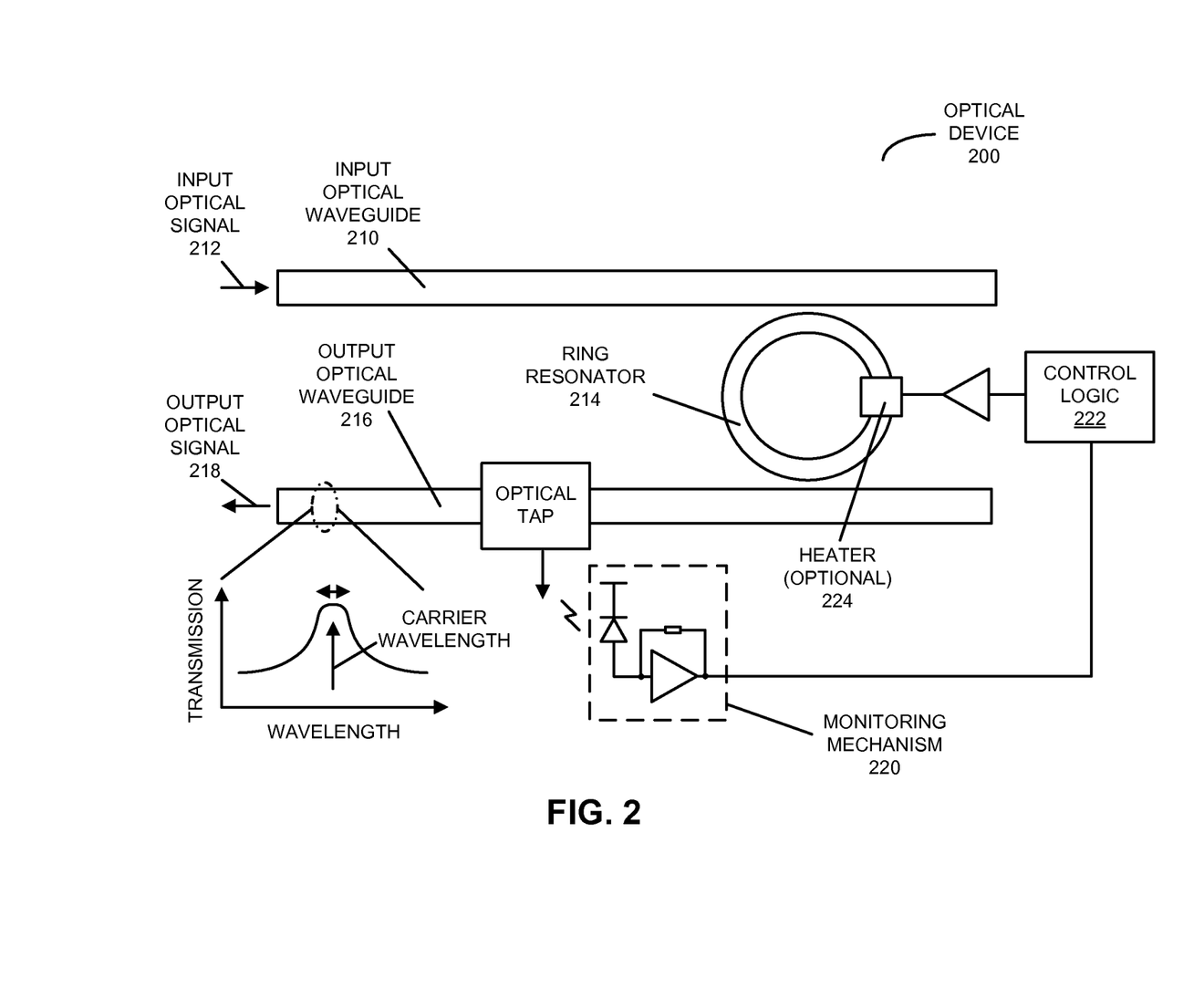
FIG. 2 is a block diagram of an optical device in accordance with an embodiment of the present disclosure.

We now describe embodiments of the optical device. FIG. 2 presents a block diagram of an optical device 200. This optical device includes: an input optical waveguide 210 that conveys an input optical signal 212 that includes multiple wavelengths ($\lambda_1, \lambda_2 \ldots \lambda_n$); a ring resonator 214, having a resonance wavelength ($\lambda_o$), optically coupled to input optical waveguide 210; an output optical waveguide 216 that conveys an output optical signal 218 that includes a wavelength in the multiple wavelengths (such as a carrier wavelength $\lambda_i$); and a monitoring mechanism 220, optically coupled to output optical waveguide 216, which monitors output optical signal 218. For example, monitoring mechanism 220 may include an optical tap followed by an optical receiver that converts the tapped optical signal into an electrical voltage signal. Furthermore, optical device 200 includes control logic 222 that adjusts the resonance wavelength based on monitored output optical signal 218, where the adjustment is made without monitoring input optical signal 212.

Ring resonator 214 may be characterized by its: quality (Q) factor, bandwidth, coupling wavelength to input optical waveguide 210 and output optical waveguide 216, and/or free-spectral range (or, equivalently, its size, such as the radius of ring resonator 214). (Note that a small ring resonator has a large free-spectral range, and a large ring resonator has a small free-spectral range.) Furthermore, ring resonator 214 may be critically or optimally coupled to input optical waveguide 210 and output optical waveguide 216 so that, at the resonance of ring resonator 214 (as well as possibly at its integer multiples or harmonics), there is maximal transfer of energy from one component to the next in optical device 200 with or without reduced reflections, such as the energy transfer from input optical waveguide 210 to ring resonator 214, etc. Note that the Q factor may determine the bandwidth of the filtering by ring resonator 214. In addition, the Q factor of ring resonator 214 is a function of the optical coupling between input optical waveguide 210 and output optical waveguide 216 and ring resonator 214, as well as a round-trip optical loss in ring resonator 214.

In some embodiments, ring resonator 214 has a high quality (Q) factor, narrow bandwidth (or passband) and/or free-spectral range so that it can pick out or select at least the wavelength of output optical signal 218 (or a group of wavelengths having a line spacing that is less than the free-spectral ranges). For example, ring resonator 214 may have a radius between 5-10 μm and a free-spectral range between 8-20 nm. However, in some embodiments ring resonator 214 picks out or selects multiple wavelengths or sets of wavelengths, which each may include a group of wavelengths, based on the free-spectral range and Q factor of ring resonator 214. For example, ring resonator 214 may have a radius between 30-100 μm and a free-spectral range between 1-2 nm.

Figure 4:
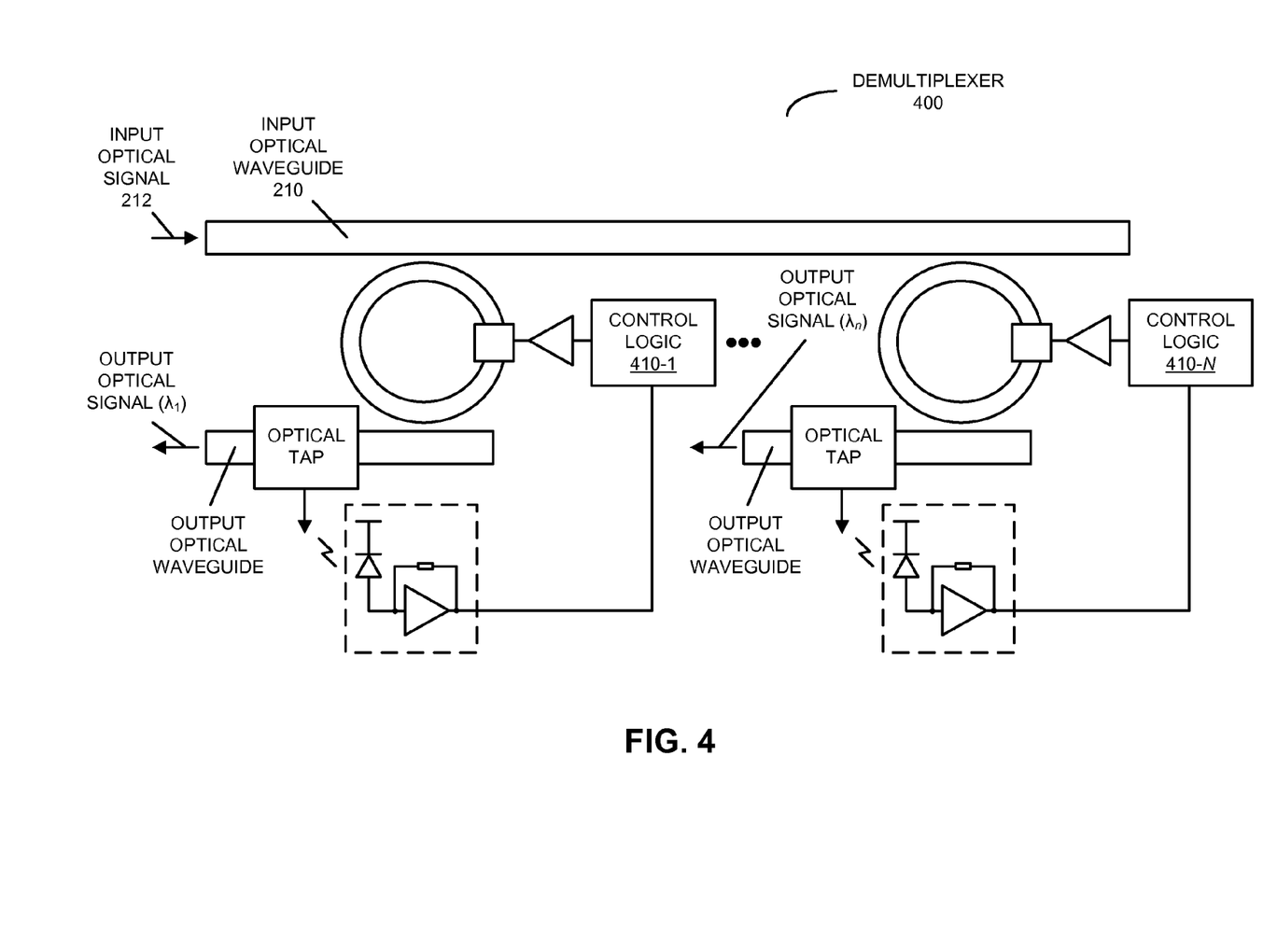
FIG. 4 is a block diagram of a demultiplexer based on the optical device of FIG. 2 in accordance with an embodiment of the present disclosure.
Figure 5:
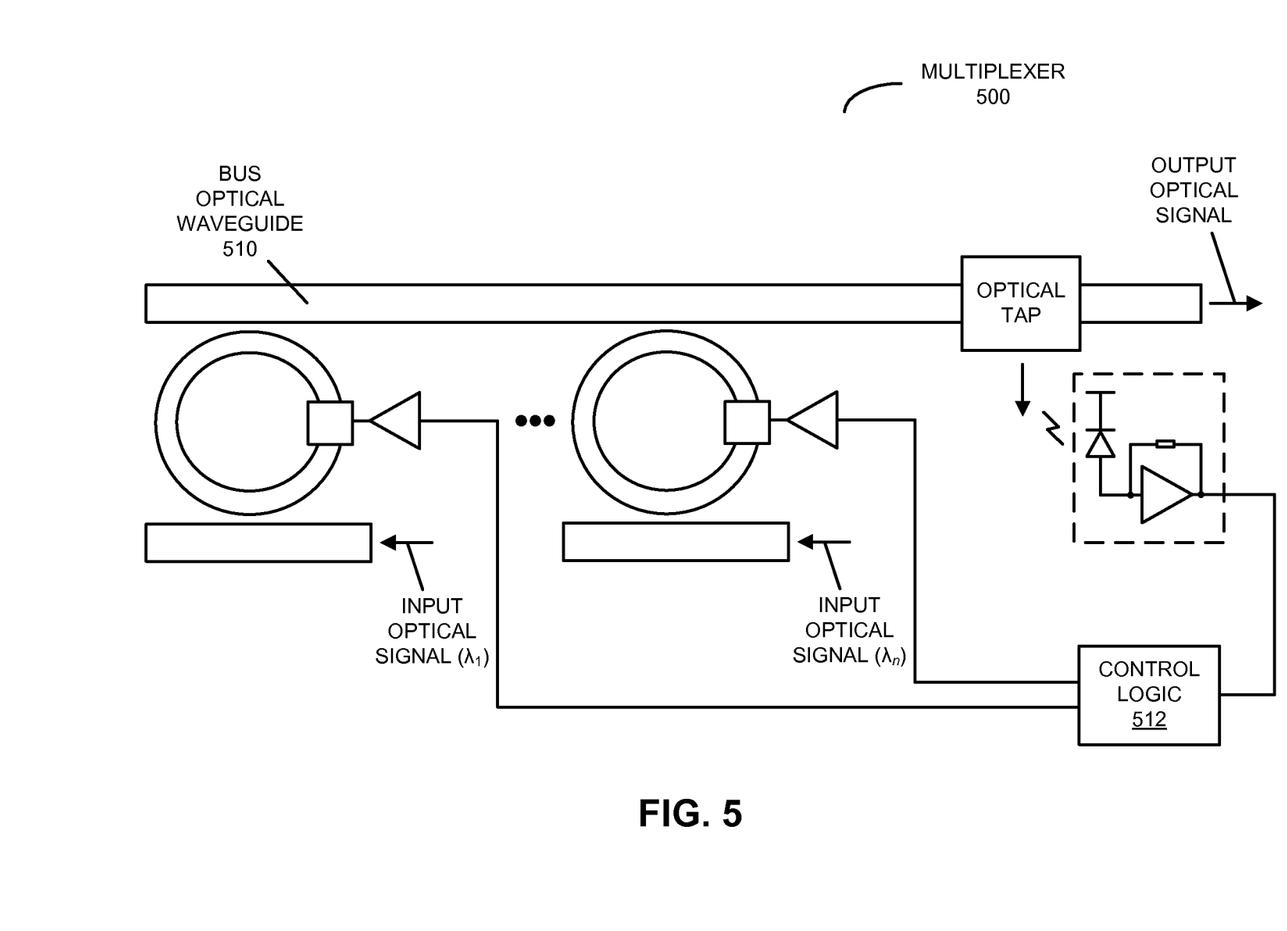
FIG. 5 is a block diagram of a multiplexer based on the optical device of FIG. 2 in accordance with an embodiment of the present disclosure.

In an exemplary embodiment, ring resonator 214 (and/or set of ring resonators in the optical demultiplexer in FIG. 4 or the optical multiplexer in FIG. 5) is tuned because temperature changes and manufacturing tolerances result in large variations in the coupling wavelengths across a wafer (or integrated circuit) and/or between wafers. In particular, control logic 222 may adjust the resonance wavelength to lock the resonance wavelength and the wavelength of output optical signal 218. For example, control logic 222 may adjust the resonance wavelength by adjusting a temperature of ring resonator 214. In some embodiments, optical device 200 includes an optional heater 224 (such as a silicon resistor integrated on the ring-resonator optical waveguide or a metal heater) thermally coupled to ring resonator 214. More generally, optical device 200 may include a phase tuner that matches a coupling wavelength of ring resonator 214 with the wavelength of output optical signal 218, thereby optically coupling an optical signal between input optical waveguide 210 and output optical waveguide 216. In this way, at least the wavelength in optical signal 218 output by optical device 200 can be tuned.

While thermal tuning is illustrated in FIG. 2, in other embodiments electrical tuning is used, for example, a p-i-n tuner. In general, thermal tuning may be used because electrical tuning may spoil the Q factor of ring resonator 214 by adding additional loss into the ring-resonator waveguide(s). However, thermal tuning may result in increased power consumption.

Figure 3:
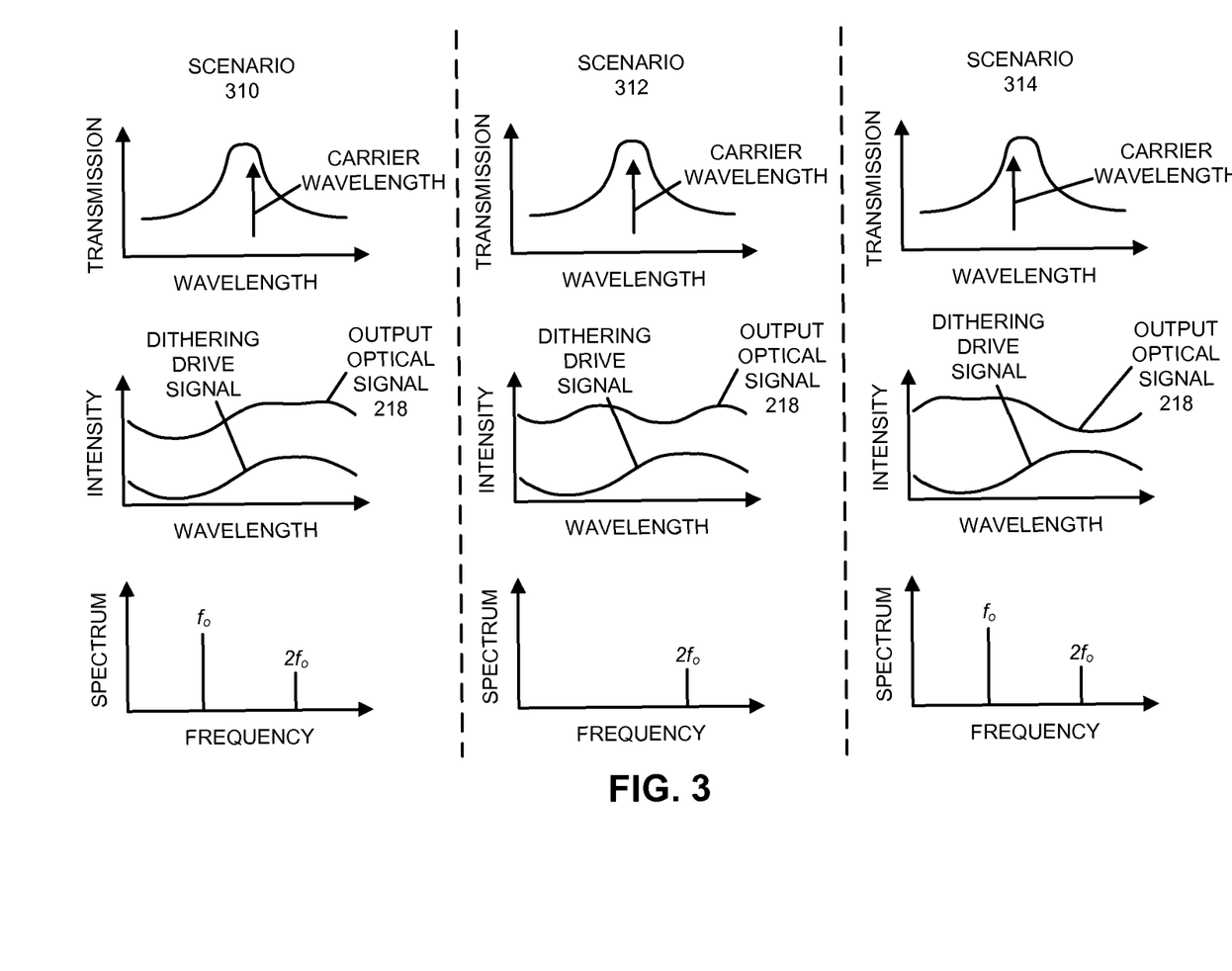
FIG. 3 is a drawing illustrating resonance dithering of the optical device of FIG. 2 in accordance with an embodiment of the present disclosure.

In order to create an error signal for control logic 222 without the needing to know input optical signal 212, control logic 222 may dither the temperature of ring resonator 214 at a frequency ($f_o$). (Note that data encoded in input optical signal 222 may have a minimum frequency that is more than twice the frequency.) In particular, control logic 222 may send a small single-tone signal to optional heater 224 to dither the ring resonance (and, thus, the resonance wavelength). This is shown in FIG. 3, which presents a drawing illustrating resonance dithering of ring-resonator filter 200 (FIG. 2). Note that the loss of optical device 200 for a selected wavelength channel (having the wavelength of output optical signal 218 in FIG. 2) changes when the ring resonance is moving around, resulting in a corresponding dithering of the output power. Consequently, the monitoring of output optical signal 218 may involve detecting amplitude and phase information at the frequency and twice the frequency. In some embodiments, the monitoring of output optical signal 218 involves calculating a transformation of output optical signal 218, such as a Fourier transform.

Depending on the relative position of the carrier wavelength and the resonance wavelength, three different types of monitoring scenarios can be obtained. In a first scenario 310, when the resonance wavelength is offset to the left of the carrier wavelength, a dithering drive signal to optional heater 224 (FIG. 2) results in a monitored output optical signal 218 and a corresponding spectrum that includes information at the frequency ($f_o$) and twice the frequency ($2f_o$) if the resonance-dithering amplitude is larger than the wavelength offset ($\lambda_o - \lambda_t$), or a single tone at the frequency if the resonance-dithering amplitude is smaller than the wavelength offset.

In a second scenario 312, when the resonance wavelength is perfectly aligned with the carrier wavelength, a dithering drive signal to optional heater 224 (FIG. 2) results in a monitored output optical signal 218 and a corresponding spectrum that includes information at twice the frequency (i.e., the amplitude in the spectrum at the frequency may be zero).

In a third scenario 314, when the resonance wavelength is offset to the right of the carrier wavelength, a dithering drive signal to optional heater 224 (FIG. 2) results in a monitored output optical signal 218 and a corresponding spectrum that includes information at the frequency ($f_o$) and twice the frequency ($2f_o$) if the resonance-dithering amplitude is larger than the wavelength offset ($\lambda_o - \lambda_t$), or a single tone at the frequency if the resonance-dithering amplitude is smaller than the wavelength offset. Note that when the resonance wavelength exceeds the carrier wavelength (scenario 314), a sign of the phase may be opposite to the sign of the phase when the resonance wavelength is less than the carrier wavelength (scenario 310). In particular, the relative phase between tone at the frequency in the spectrum and the phase at the frequency in the dithering drive signal have opposite signs for these two scenarios.

Although the amplitudes of the spectrums of scenarios 310 and 314 are similar, control logic 222 can adjust the phase difference to determine the right tuning direction to correct the ring resonance until the spectrum only includes the information at twice the frequency. Note that the amount of correction can be determined by the amplitude ratio of the tone in the spectrum at the frequency and the tone in the spectrum at twice the frequency. Because both of these tones are proportional to the input signal power, the ratio of the two is independent of the input-power variation. Consequently, the control technique may be independent of the input-power variation.

By cascading multiple instances of the optical device, a multi-wavelength demultiplexer with wavelength locking can be implemented. This is shown in FIG. 4, which presents a block diagram of a demultiplexer 400. In FIG. 4, control logic 410 for the instances of the optical device may use dithering drive signals having the same frequency or different frequencies.

Similarly, multiple instances of the optical device may be used along a shared bus optical waveguide in a multi-wavelength multiplexer with wavelength locking. This is shown in FIG. 5, which presents a block diagram of a multiplexer 500. Because the wavelength channels are multiplexed into a common bus optical waveguide 510, control logic 512 may send dithering drive signals having different frequencies to the ring resonators. An optical tap at the end of multiplexer 500 can be used to monitor the wavelength channels. In this embodiment, control logic 512 processes different dithering tone frequencies and their corresponding doubled tone frequencies (or tones at twice the frequencies) for the different wavelength channels.

Figure 6:
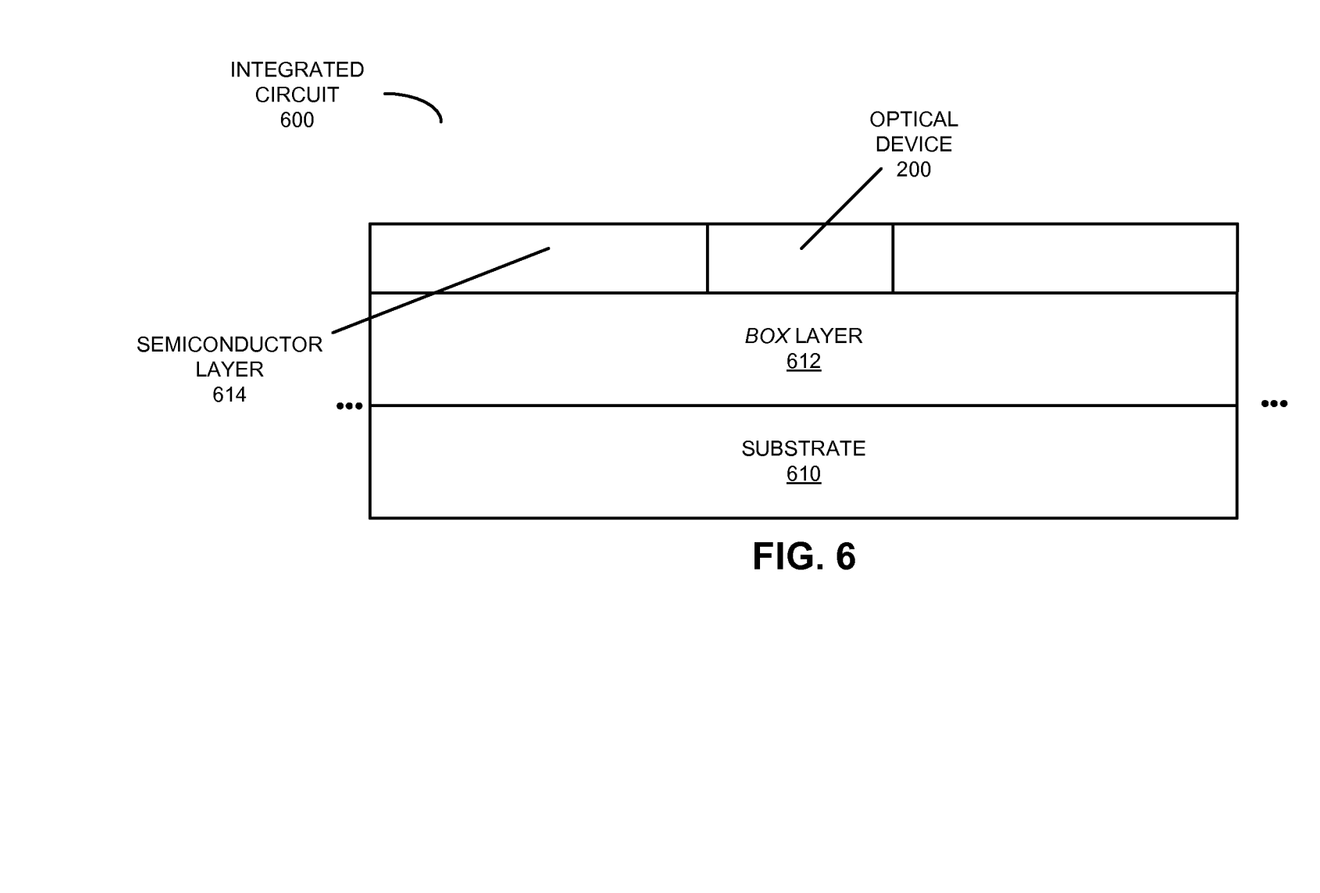
FIG. 6 is a block diagram illustrating a side view of an integrated circuit that includes the optical device of FIG. 2 in accordance with an embodiment of the present disclosure.

In some embodiments, optical device 200 (FIG. 2) is disposed on an integrated circuit. This is shown in FIG. 6, which presents a block diagram illustrating an integrated circuit 600. In this integrated circuit, portions of optical device 200 (including input optical waveguide 210, output optical waveguide 216 and ring resonator 214 in FIG. 2) may be defined in a semiconductor layer 614. Furthermore, integrated circuit 600 may include a substrate 610 and a buried-oxide layer (BOX) 612 deposited on substrate 610, where semiconductor layer 614 is disposed on buried-oxide layer 612.

Note that substrate 610 may include silicon, buried-oxide layer 612 may include a dielectric or an oxide (such as silicon dioxide), and/or semiconductor layer 614 may include silicon (thus, input optical waveguide 210 and output optical waveguide 216 may include silicon optical waveguides). Therefore, substrate 610, buried-oxide layer 612 and semiconductor layer 614 may constitute a silicon-on-insulator (SOI) technology. In some embodiments, the silicon in semiconductor layer 614 is 0.5 μm thick, and the silicon-dioxide layer may have a thickness between 0.1 and 10 μm.

Note that in some embodiments, such as FIG. 6, the light is confined in semiconductor layer 614 and may be surrounded on all sides (including below) by an oxide. However, in other embodiments a waveguide ring or a waveguide modulator may be fabricated using a different confinement, such as a polymer ring deposited on an oxide, or polysilicon surrounded by an oxide (in which case buried-oxide layer 612 may not be needed).

Figure 7:
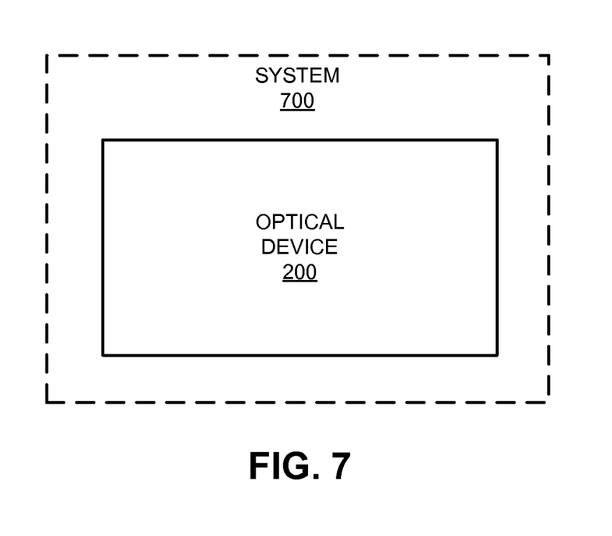
FIG. 7 is a block diagram illustrating a system that includes the optical device of FIG. 2 in accordance with an embodiment of the present disclosure.

One or more of the preceding embodiments of the optical device may be included in a system and/or an electronic device. This is illustrated in FIG. 7, which presents a block diagram illustrating a system 700 that includes optical device 200.

The optical device may be used in a variety of applications, including: VLSI circuits, communication systems (such as WDM), storage area networks, data centers, networks (such as local area networks), and/or computer systems (such as multiple-core processor computer systems). Note that system 700 may include, but is not limited to: a server, a laptop computer, a communication device or system, a personal computer, a work station, a mainframe computer, a blade, an enterprise computer, a data center, a portable-computing device, a supercomputer, a network-attached-storage (NAS) system, a storage-area-network (SAN) system, and/or another electronic computing device. Moreover, note that a given computer system may be at one location or may be distributed over multiple, geographically dispersed locations.

Optical device 200 (FIG. 2), integrated circuit 600 (FIG. 6) and/or system 700 may include fewer components or additional components. For example, semiconductor layer 614 in FIG. 6 may include polysilicon or amorphous silicon. Furthermore, a wide variety of fabrication techniques may be used to fabricate the optical device in the preceding embodiments, as is known to one of skill in the art. In addition, a wide variety of optical components may be used in or in conjunction with the optical device (such as alternative optical filters that replace ring resonator 214 in FIG. 2).

Although these embodiments are illustrated as having a number of discrete items, the embodiments of the optical device, the integrated circuit and the system are intended to be functional descriptions of the various features that may be present rather than structural schematics of the embodiments described herein. Consequently, in these embodiments two or more components may be combined into a single component, and/or a position of one or more components may be changed.

Figure 8:
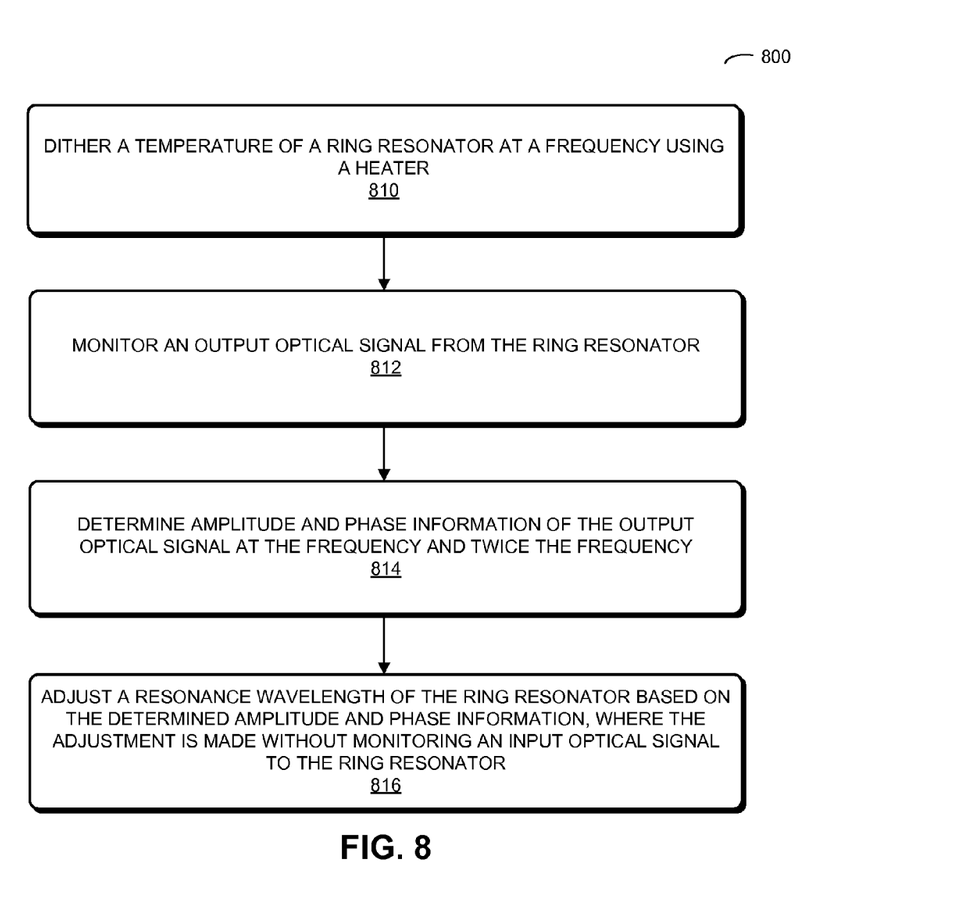
FIG. 8 is a flow chart illustrating a method for locking a resonance wavelength of a ring resonator to a wavelength of an optical signal in accordance with an embodiment of the present disclosure.

We now describe embodiments of the method. FIG. 8 presents a flow chart illustrating a method 800 for locking a resonance wavelength of a ring resonator to a wavelength of an optical signal, which may be performed by an optical device (such as optical device 200 in FIG. 2). During operation, the optical device dithers a temperature of the ring resonator at a frequency using a heater (operation 810). Then, the optical device monitors an output optical signal from the ring resonator (operation 812), and determines amplitude and phase information of the output optical signal at the frequency and twice the frequency (operation 814). Next, the optical device adjusts the resonance wavelength based on the determined amplitude and phase information, where the adjustment is made without monitoring an input optical signal to the ring resonator (operation 816).

In some embodiments of method 800, there may be additional or fewer operations. Moreover, the order of the operations may be changed, and/or two or more operations may be combined into a single operation.

While the preceding embodiments illustrate the use of the optical device in conjunction with an optical link, the optical device may be used in applications other than communications, such as: manufacturing (cutting or welding), a lithographic process, data storage (such as an optical-storage device or system), medicine (such as a diagnostic technique or surgery), a barcode scanner, entertainment (a laser light show), and/or metrology (such as precision measurements of distance).

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An optical device, comprising:
an input optical waveguide configured to convey an input optical signal that includes multiple wavelengths;
a ring resonator, having a resonance wavelength, optically coupled to the input optical waveguide;
an output optical waveguide configured to convey an output optical signal that includes a wavelength in the multiple wavelengths;
a monitoring mechanism, optically coupled to the output optical waveguide, configured to monitor the output optical signal; and
control logic configured to adjust the resonance wavelength based on the monitored output optical signal, wherein the adjustment is made without monitoring the input optical signal, wherein the control logic is configured to adjust the resonance wavelength by adjusting a temperature of the ring resonator, wherein the control logic is configured to dither the temperature of the ring resonator at a frequency, and wherein the monitoring mechanism is configured to detect amplitude and phase information at the frequency and twice the frequency.

2. The optical device of claim 1, wherein the control logic adjusts the resonance wavelength to lock the resonance wavelength and the wavelength of the output optical signal.

3. The optical device of claim 1, wherein the optical device further comprises a heater thermally coupled to the ring resonator.

4. The optical device of claim 1, wherein, when the resonance wavelength and the wavelength of the output optical signal are locked, the amplitude at the frequency is zero and the amplitude at twice the frequency is non-zero.

5. The optical device of claim 1, wherein, when the resonance wavelength exceeds the wavelength of the output optical signal, a sign of the phase is opposite to the sign of the phase when the resonance wavelength is less than the wavelength of the output optical signal.

6. The optical device of claim 1, wherein the monitoring of the output optical signal involves a Fourier transform.

7. A system, comprising an optical device, wherein the optical device includes:
an input optical waveguide configured to convey an input optical signal that includes multiple wavelengths;
a ring resonator, having a resonance wavelength, optically coupled to the input optical waveguide;
an output optical waveguide configured to convey an output optical signal that includes a wavelength in the multiple wavelengths;
a monitoring mechanism, optically coupled to the output optical waveguide, configured to monitor the output optical signal; and
control logic configured to adjust the resonance wavelength based on the monitored output optical signal, wherein the adjustment is made without monitoring the input optical signal, wherein the control logic is configured to adjust the resonance wavelength by adjusting a temperature of the ring resonator, wherein the control logic is configured to dither the temperature of the ring resonator at a frequency, and wherein the monitoring mechanism is configured to detect amplitude and phase information at the frequency and twice the frequency.

8. The system of claim 7, wherein the control logic adjusts the resonance wavelength to lock the resonance wavelength and the wavelength of the output optical signal.

9. The system of claim 7, wherein the optical device further comprises a heater thermally coupled to the ring resonator.

10. The system of claim 7, wherein, when the resonance wavelength and the wavelength of the output optical signal are locked, the amplitude at the frequency is zero and the amplitude at twice the frequency is non-zero.

11. The system of claim 7, wherein, when the resonance wavelength exceeds the wavelength of the output optical signal, a sign of the phase is opposite to the sign of the phase when the resonance wavelength is less than the wavelength of the output optical signal.

12. The system of claim 7, wherein the monitoring of the output optical signal involves a Fourier transform.

13. A method for locking a resonance wavelength of a ring resonator to a wavelength of an optical signal, wherein the method comprises:

dithering a temperature of the ring resonator at a frequency using a heater;

monitoring an output optical signal from the ring resonator;

determining amplitude and phase information of the output optical signal at the frequency and twice the frequency; and adjusting the resonance wavelength based on the determined amplitude and phase information, wherein the adjustment is made without monitoring an input optical signal to the ring resonator.

14. The method of claim 13, wherein, when the resonance wavelength and the wavelength of the output optical signal are locked, the amplitude at the frequency is zero and the amplitude at twice the frequency is non-zero.

* * * * *